United States Patent [19]

Herndon et al.

[11] Patent Number: 4,749,154
[45] Date of Patent: Jun. 7, 1988

[54] EJECTION SEAT HAVING COMBINED CATAPULT/ROCKET MOTOR PROVIDING SELECTABLE THRUST

[75] Inventors: Gerald F. Herndon, Bellevue; Roger F. Yurczyk, Kent, both of Wash.

[73] Assignee: The Boeing Company, Seattle, Wash.

[21] Appl. No.: 782,219

[22] Filed: Sep. 30, 1985

[51] Int. Cl.⁴ ............................................ B64D 25/10
[52] U.S. Cl. ............................................ 244/122 AB
[58] Field of Search ...... 244/122 A, 122 AB, 122 AC, 244/122 AD, 122 AE

[56] References Cited

U.S. PATENT DOCUMENTS

| | | | |
|---|---|---|---|
| 2,467,763 | 4/1949 | Martin | 244/122 |
| 2,900,150 | 8/1959 | Hirt et al. | 244/122 |
| 2,937,830 | 5/1960 | Fulton | 244/122 |
| 2,954,947 | 10/1960 | Zabelka et al. | 244/122 |
| 3,027,125 | 3/1962 | Fulton | 244/122 |
| 3,035,796 | 5/1962 | Glass | 244/122 |
| 3,055,619 | 9/1962 | MacDonald, Jr. et al. | 244/122 |
| 3,116,900 | 1/1964 | Fulton | 244/122 |
| 3,124,324 | 3/1964 | Martin | 244/122 |
| 3,169,003 | 2/1965 | Glass | 244/122 |
| 3,186,662 | 6/1965 | Martin | 244/122 |
| 3,190,589 | 6/1965 | Mennborg | 244/122 |
| 3,259,344 | 7/1966 | Thorp | 244/122 |
| 3,282,161 | 11/1966 | MacDonald, Jr. et al. | 89/1.818 |
| 4,036,456 | 7/1977 | Skinner et al. | 244/122 |

Primary Examiner—Joseph F. Peters, Jr.
Assistant Examiner—Rodney Corl
Attorney, Agent, or Firm—Eugene O. Heberer

[57] ABSTRACT

An aircraft ejection seat (10, 120) having a combined catapult (46, 122) and rocket motor (88, 90, 130, 132, 142, 144) in which the amount of rocket thrust is selectable. An outer catapult tube (46, 122) forms a seat support structure. In the outer catapult tube there is a plug (66, 66A) at its upper end before ejection and carries a propellant for ejecting the seat from the aircraft when the propellant is discharged. There is a fixed sleeve (84) in the lower end of the outer catapult having an internal circumferential bearing surface with which the inner catapult tube is engaged before and during ejection. The holding sleeve is positioned to engage the plug (66, 66A) when the ejection has become complete. The plug then seals the outer catapult to receive gas from the rocket gas generators to elevate the seat substantially above the aircraft, as necessary under certain conditions.

17 Claims, 5 Drawing Sheets

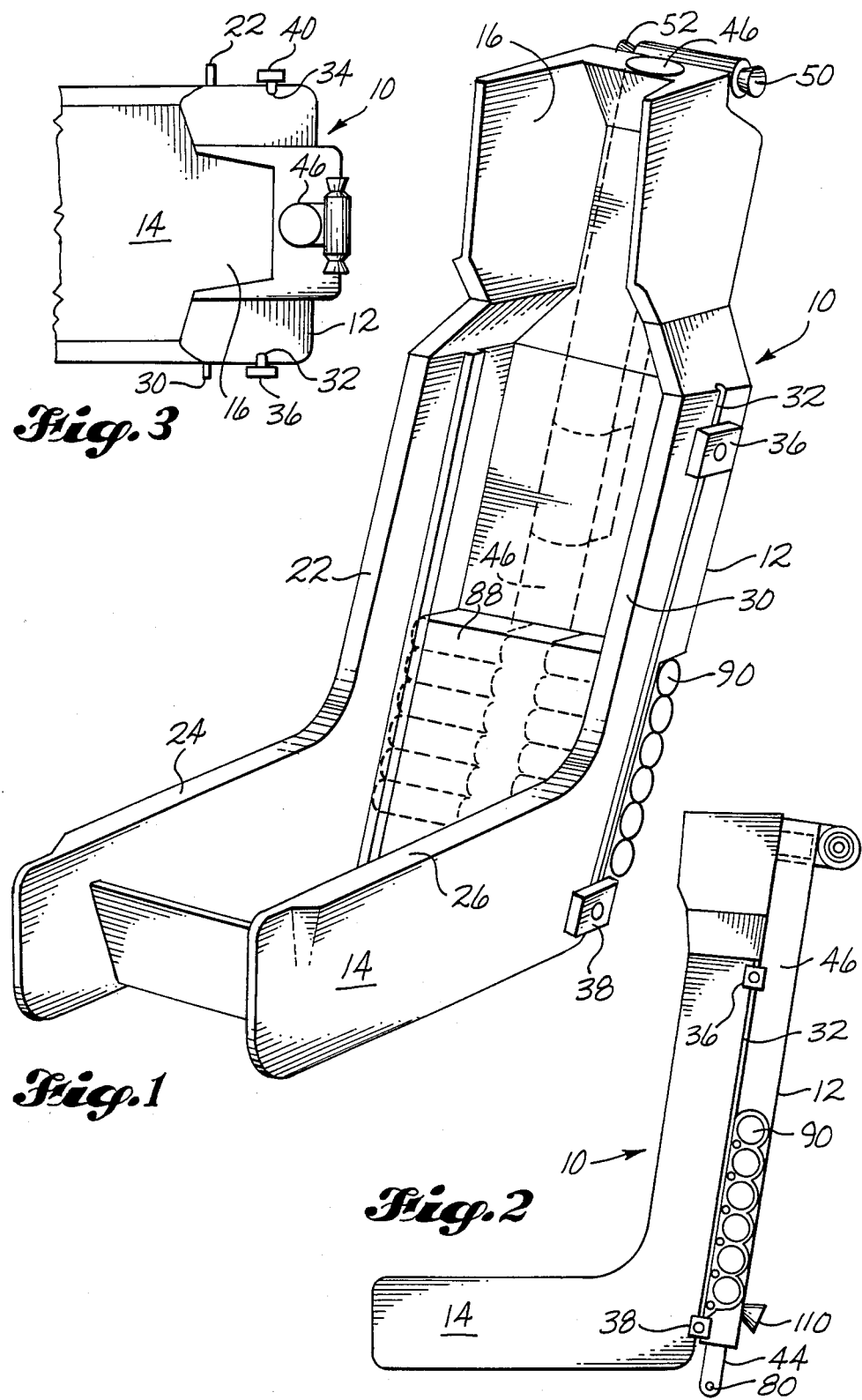

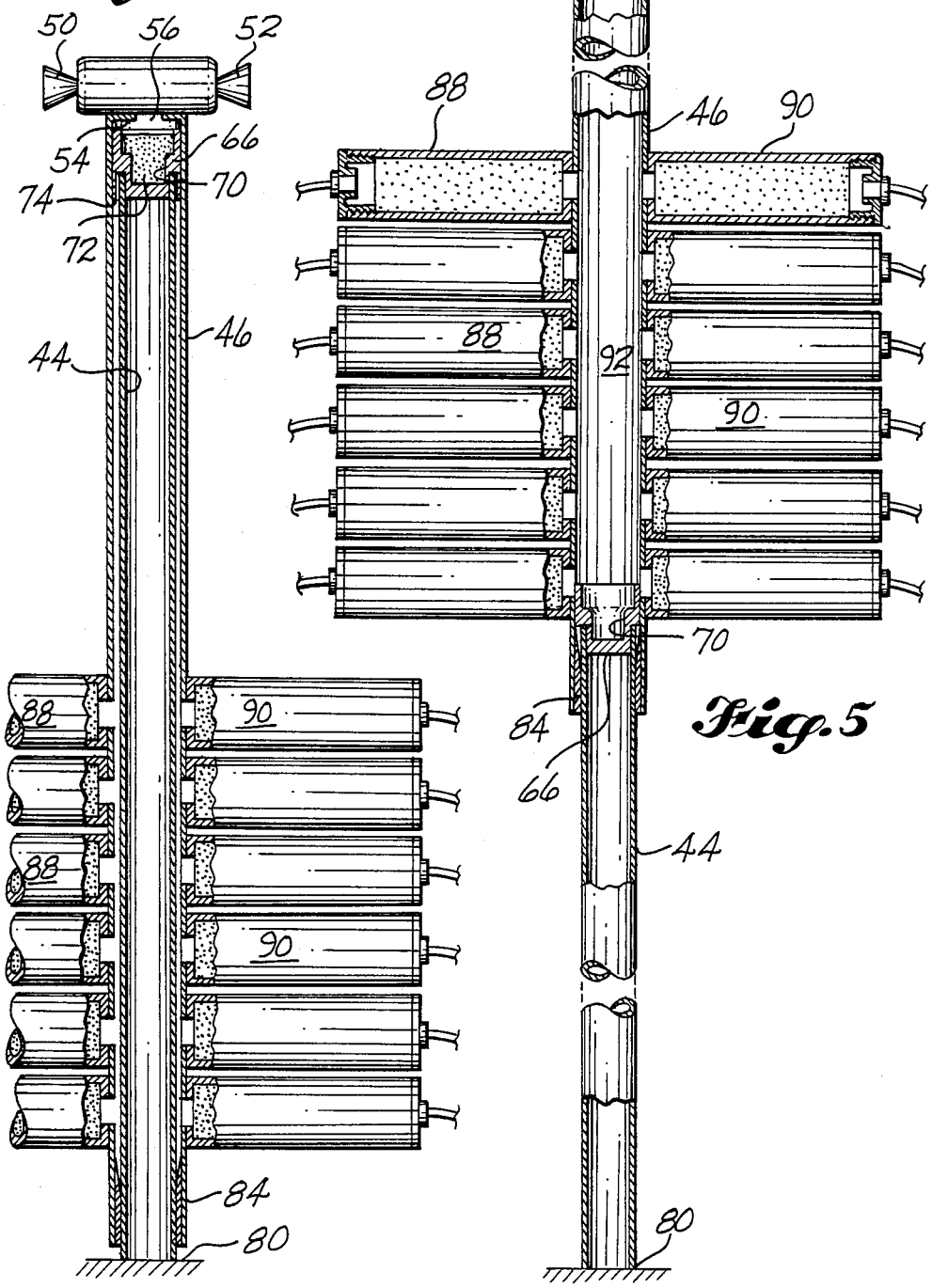

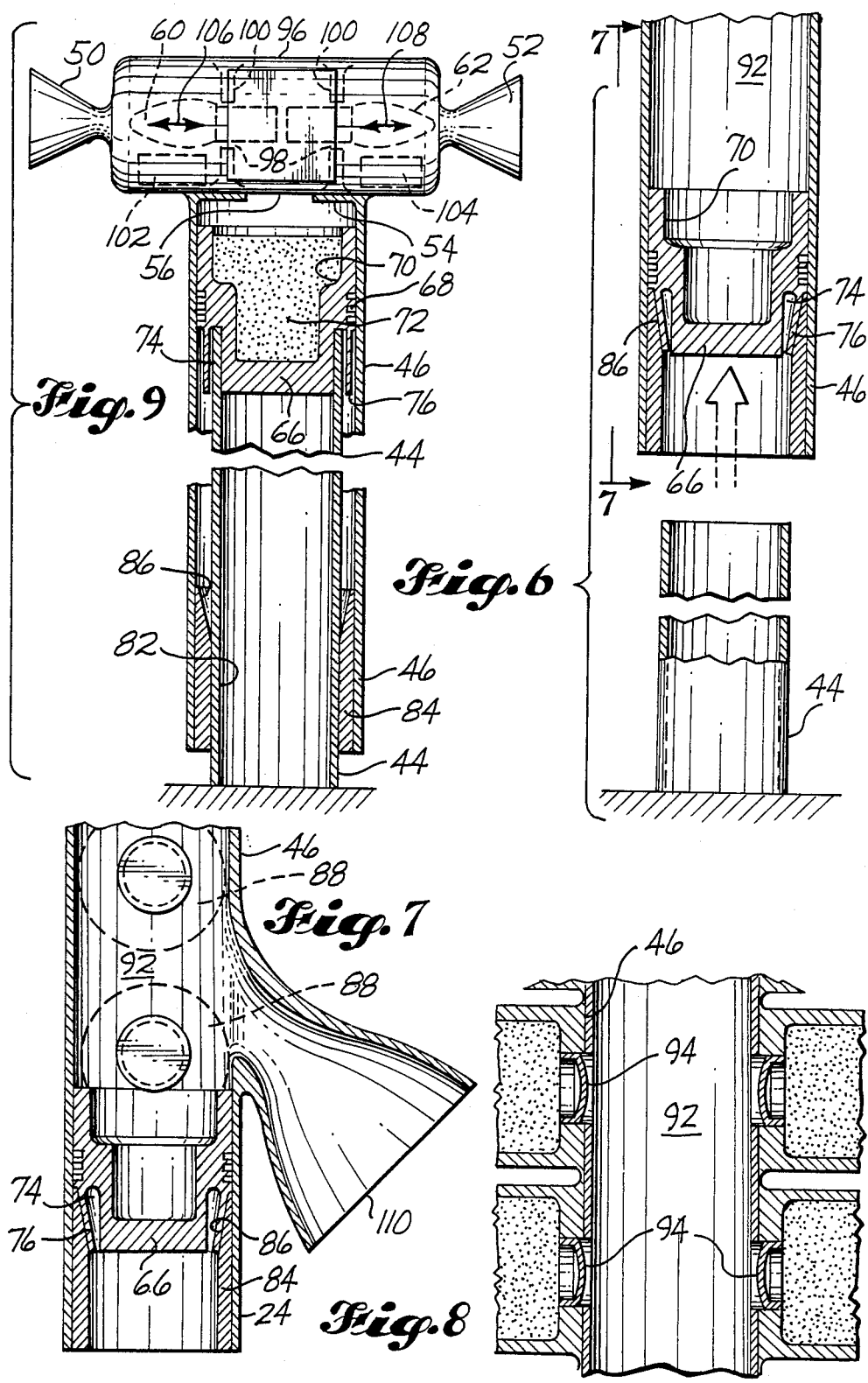

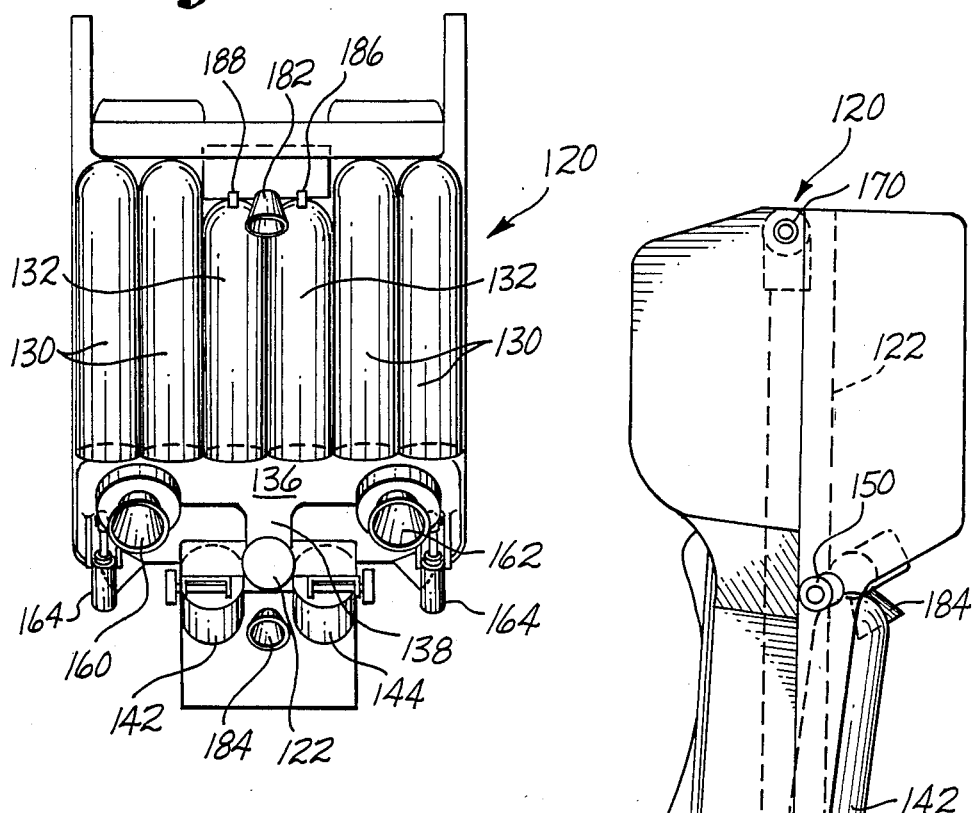
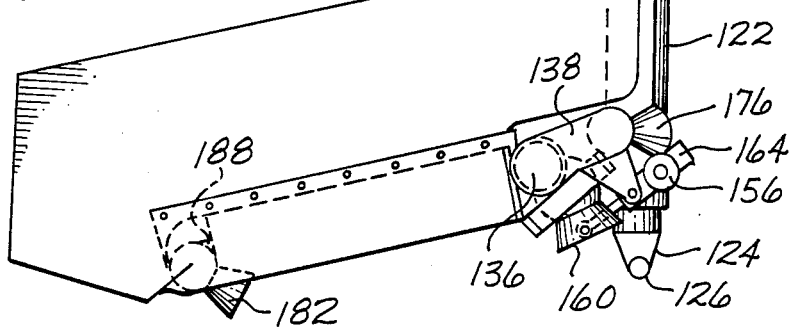

EJECTION SEAT HAVING COMBINED CATAPULT/ROCKET MOTOR PROVIDING SELECTABLE THRUST

DESCRIPTION

1. Technical Field

The invention relates to aircraft ejection seats, and more particularly, to ejection seats having a catapult propellant for ejection and having a series of rocket motors being selectably dischargeable after ejection into an outer catapult tube ejected with the seat.

2. Background Art

Ejection seats currently being used in high performance military aircraft incorporate a catapult for ejecting the pilot and/or crewmember from the aircraft and a rocket which propels the seat upwardly several hundred feet in order to ensure sufficient time for the seat occupant's recovery parachute to deploy, in the event of a ground level ejection.

In some seat configurations the catapult and rockets are separate components, and in other configurations they are combined into a single component. New ejection seat requirements make it necessary to carry more rocket propellant than can be contained in the catapult tubes. Therefore, the current approaches of combining catapult and rocket motors will no longer function adequately.

In addition to the requirement for increased rocket propellant volume, the needed capability to control or select the catapult and rocket thust levels requires a new approach. One concept that has been suggested by Atlantic Research Corporation of Gainesville, Va. 22065 to control the rocket thrust profile is with the use of small motor arrangements. In this concept, separate, small propellant charges would be sequentially ignited to achieve a controlled pressure in the rocket motor chamber.

A search of the patent literature discloses ejection seats of a general interest. For example, U.S. Pat. No. 2,467,763 to Martin shows an ejection seat having sliding inner and outer catapult tubes, the inner tube being secured to the seat and is ejected therewith. The outer tube stays with the airplane and has means at intervals along its length for supplmentary cartridges to be discharged into the telescoping arrangement of the tubes to add force during the ejection. U.S. Pat. No. 3,027,125 to Fulton is similar in general to U.S. Pat. No. 2,467,763 but provides rocket propulsion after seat ejection. The rocket charge is contained within the tube ejected with the seat. U.S. Pat. No. 3,035,796 to Glass teaches the use of a booster tube and a free flight rocket combined in one tube. U.S. Pat. No. 3,186,662 to Martin discloses the concept of a multi-pack of rocket canisters.

The following patents disclose ejection systems of general interest:

U.S. Pat. No. 2,900,150, G. E. Hirt et al.
U.S. Pat. No. 2,937,830, N. D. Fulton
U.S. Pat. No. 2,954,947, R. J. Zabelka et al.
U.S. Pat. No. 3,055,619, H. D. MacDonald, Jr. et al.
U.S. Pat. No. 3,116,900, N. D. Fulton
U.S. Pat. No. 3,124,324, J. Martin
U.S. Pat. No. 3,169,003, C. A. Glass
U.S. Pat. No. 3,190,589, H. J. T. Mennborg
U.S. Pat. No. 3,259,344, J. T. Thorp
U.S. Pat. No. 3,282,161, H. D. MacDonald, Jr. et al.
U.S. Pat. No. 4,036,456, Skinner et al.

DISCLOSURE OF THE INVENTION

The invention is an aircraft ejection seat having a combined catapult and rocket motor in which the amount of thrust after ejection is selectable for carrying it away from the aircraft. The seat has an outer catapult tube fixedly secured to the seat for ejection therewith and an inner catapult tube slidably engaged within the outer tube and having its lower end fixedly secured to the aircraft. The catapult tubes extend upwardly adjacent the rear of the seat.

The outer tube forms a part of the seat and provides seat support structure along the back. It is closed adjacent its upper end by valve means which are used, when open, to apply hot gas from ignited gas generators to roll thrusters to achieve or maintain the proper attitude of the seat after ejection.

There is a plug within the outer catapult tube carrying a propellant and engaged with the inner tube and to engage and seal the outer tube when the proellant is discharged. The plug is moved relatively downwardly during the ejection to adjacent the lower end of the outer tube and forms a plug seal in the outer tube adjacent its lower end. There is a bearing, forming holding means for the plug, fixed in the outer tube adjacent its lower end.

Before ejection, the propellant carrying plug is slidably and sealingly engaged in the outer tube at its upper end, the outer tube being generally cylindrical. The plug has a circumferential groove in its lower end and is open downwardly to receive the upper end of the inner tube before ejection.

The bearing in the lower end of the outer tube is slidably engaged with the inner tube adjacent its lower end before ejection. The bearing has an upper inner conical surface for receiving a generally cylindrical deformable wall forming the outer portion of the groove in the plug. The wall is deformed conically inwardly to be fitted within the conical surface of the bearing during ejection after the outer tube has been withdrawn from the inner tube.

After ejection the outer tube is hollow between its closed upper end and its plugged lower end and it is open adjacent its lower end to a primary rocket nozzle. After ejection the outer tube is also open to and forms a manifold for a series of individual gas generators connected to the outer tube and being separably dischargeable according to the thrust requirements after ejection. The gas generators are enclosed within the back of the seat, transversely outwardly of the outer tube which is generally centrally positioned in the back of the seat. The gas generators are juxtaposed, one being on top of the other on both sides of the outer tube.

Two oppositely directed roll/attitude thruster nozzles are secured ajdacent the top of the seat back. They are supplied with thrust through servovalves. A supply of gas forming the thrust is developed in the gas generators as they are ignited and as they are discharged into the outer catapult tube.

In a second embodiment the outer tube is generally the same as the outer tube as described above. However, after ejection it opens to a manifold for a plurality of gas generators connected to the manifold and being separately dischargeable according to the thrust requirements after ejection. These individual gas generators are secured under the sitting portion of the seat and the manifold is rearwardly thereof between the gas generators and the outer tube. There are also individual gas generators fitted along the outer tube adjacent the rear of the seat and extending along the side of the outer tube.

In the second embodiment there are two primary thrust nozzles spaced to be adjacent opposite sides of the rear of the seat and connected to the manifold. The primary thrust nozzles are capable of projecting the ejected seat to a safe distance from the aircraft and upwardly from the ground surface as necessary.

There are also two yaw thrust control nozzles spaced to be adjacent opposite sides of the rear of the seat and connected to the manifold. The yaw control nozzles are operable by servovalves to be fully opened, partially opened, one open more than the other or balanced. There are two separate pitch control nozzles, one being forwardly centrally under the seat and the other being upwardly on the rear of the seat. The pitch control nozzles are operable by servovalves and at least one must be open.

In the second embodiment the valve means adjacent the top of the seat are the same as in the first embodiment except that they are for oppositely directed roll and yaw maximum control thruster nozzles.

The advantages of the combined catapult-rocket motor concept (over separate rocket and catapult) in the first embodiment are indicated in the following. One pair of pintle valves controls the catapult and roll control rocket nozzles. They also serve to vent gas if excessive pressure builds up in the manifold and outer tube. The outer catapult tube serves as a manifold for the gas generators. The outer tube stiffens the seat back shell structure along with the rocket motors. The positioning of the gas generators along side of the outer tube in the seat back provides a convenient location without using excessive space. The invention also allows the use of the single catapult along the seat center line.

In the second embodiment the positioning of the gas generators below the seating area of the seat provides for a low center of gravity for the seat. This embodiment also includes two yaw control thrust nozzles, two separate pitch control nozzles and two oppositely directed roll and yaw maximum control thruster nozzles.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is a pictorial view of an ejection seat, according to the invention, in which the outer catapult tube forms a manifold for gas generators fitted in the back of the seat and which are portions of a rocket that is fired after the seat has been ejected;

FIG. 2 is a side elevational view of the seat shown in FIG. 1;

FIG. 3 is top plan view of FIG. 1, rotated about 60°;

FIG. 4 is a front fragmentary substantially cross-sectional view of the arrangement of the inner and outer catapult tubes, the individual rocket motors, and the ejection propellant plug;

FIG. 5 is a view showing the elements in FIG. 4 after the ejection has commenced and just before the outer catapult tube is disengaged from the inner catapult tube;

FIG. 6 is a fragmentary view illustrating the separation of the inner and outer catapult tubes after ejection and the seating of a plug in the lower end of the outer catapult tube;

FIG. 7 is a fragmentary cross-sectional view, taken along the line 7—7 in FIG. 6, illustrating a position of the main rocket thrust nozzle and gas generators after ejection;

FIG. 8 is a fragmentary view of the outer catapult and the arrangement of the rocket motors in position to discharge into the outer catapult tube;

FIG. 9 is a fragmentary view of the inner and outer catapult tube arrangement before ejection and a view of the pintle valves in the roll/attitude rocket thruster nozzles;

FIG. 10 is a side elevational view of another embodiment of the invention in which most of the gas generators, which are ignited after ejection, are positioned under the seating area of the seat and some of the gas generators are positioned extending vertically along the outer catapult tube;

FIG. 11 is a bottom plan view of the seat shown in FIG. 10; and

BEST MODE FOR CARRYING OUT THE INVENTION

Figure 12:
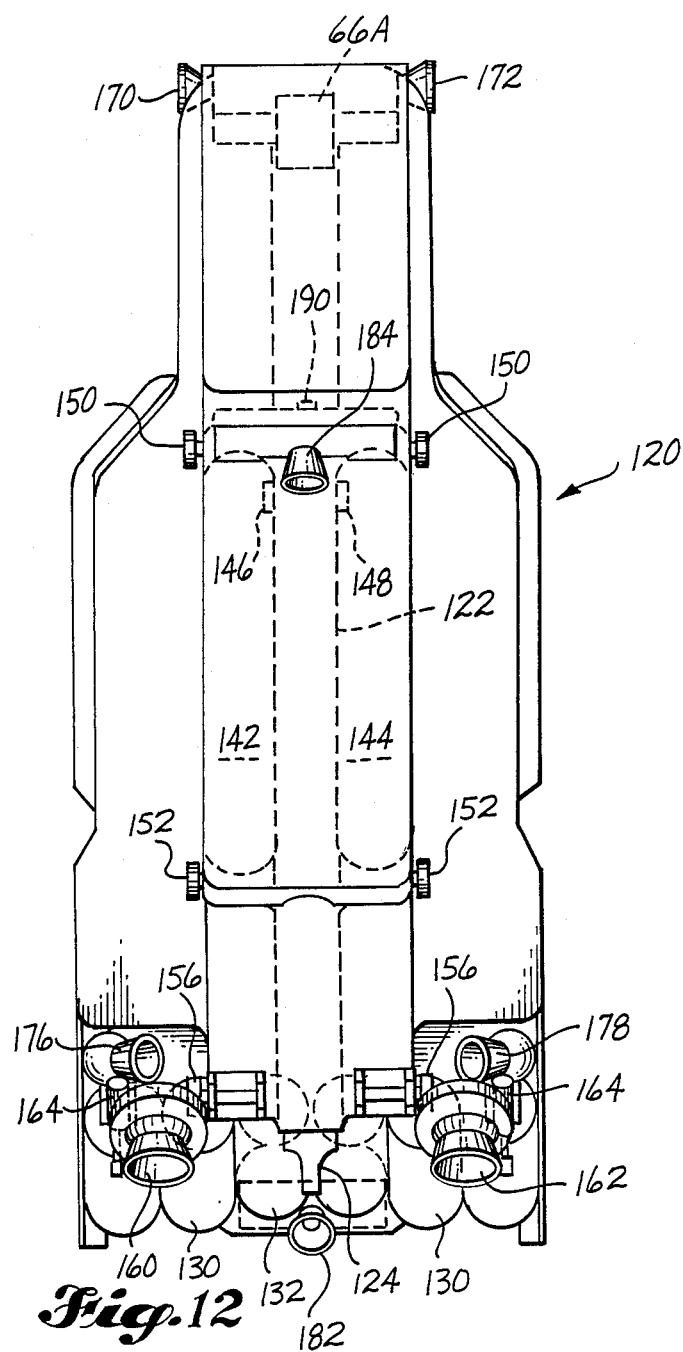
FIG. 12 is a rear elevational view of the seat shown in FIG. 10.

Referring again to the drawings, there is shown in FIGS. 1–3 an ejection seat, generally designated as 10, having a back portion 12, a seat portion 14, and a headrest area 16, the internal parts being omitted. The seat has flanged edges 22, 24, 26 and 30 and rearwardly of the flanges 22 and 30 are grooves 32 and 34 in which pins secured to slipper blocks 36, 38 and 40 are secured. The slipper blocks 36, 38 are secured together by a link, not shown, and extending rearwardly from each of the slipper blocks unshown vertical links are generally horizontal links, not shown which are secured to the aircraft. Thus, the links connected to the slipper blocks and the blocks remain in the aircraft as the seat is ejected. The pins which extend into the grooves 32 and 34 retain their vertical position as the seat is ejected, the grooves moving upwardly on the pins and the four bar linkage, not shown, retains the slipper blocks generally in place as the ejection occurs.

Inner and outer catapults 44 and 46 are shown forming part of the seat back structure, centrally positioned therein and extending generally vertically so that the outer catapult tube siffens the seat back shell structure. The catapult arrangement is more specifically, shown in FIGS. 4–9, along with roll thruster nozzles 50 and 52 secured adjacent top 54 of the outer catapult 46. The outer catapult is open at 56, FIG. 9, to pintle valves 60 and 62 which are normally closed to shut off the roll thrusters 50, 52 during ejection and thereby close the top of the outer catapult. The pintle valves can be opened symmetrically to relieve the catapult pressure if it exceeds a specified level.

Below the top of the catapult, prior to ejection is a generally cylindrical plug 66 having circumferential labyrinth seals 68 so that the plug 66 is slidably and sealingly engaged within the outer catapult.

A large part of the plug is formed a cavity 70 which is filled with a propellant 72. The propellant is the charge which, when ignited, causes the seat to be ejected from the aircraft.

At the lower end of the plug 66 is a downwardly opening cylindrical groove 74, best seen in FIG. 9, the groove having an outer cylindrical wall 76 thin enough to be deformable. Prior to ejection the upper end the inner catapult 44 is fitted within the groove 74 and its lower end is secured to the aircraft at 80, FIG. 2. The inner catapult tube is generally cylindrical and is slidably engaged with the cylindrical lower end of the plug and at the lower end of the outer catapult, the outer surface of the inner catapult is slidably engaged with an inner cylindrical bearing surface 82 of a holding sleeve 84 fixed within the lower end of the outer catapult. The cylindrical opening in sleeve 84 has an upwardly opening internal conical surface 86.

When the charge in 72 is ignited to eject the seat, the valves 60 and 62 being closed, by a microprocessor, not shown, pressure builds up in the outer catapult above the plug and moves the outer catapult and seat outwardly so as to be ejected. At the same time the plug moves downwardly as the outer catapult moves outwardly away from the inner catapult tube 44, FIGS. 5-9. As the plug 66 moves downwardly, the outer wall 76 of the groove moves into contact with the conical surface 86 of the holding sleeve 84 and the wall 76 is deformed to fully engage the surface 86 and stop the plug, the plug providing a seal for the lower end of the catapult tube 46.

Individually ignitable gas generators 88 and 90 are positioned in the seat back, as shown in FIGS. 1, 2, 4, 5, 7 and 8, and are connected to be open to the hollow catapult tube 46 which forms, after ejection, a manifold 92. Catapult 92 is opened to each individual gas generators 88 and 92 which have on each inner end, FIG. 8, a frangible metal blow-out seal 94. The seals are made to blow out when the individual gas generator is ignited but do not blow inwardly by the force of gases within the manifold developed by the discharge of one or more of the other gas generators 88, 90.

After ejection the seat may be too close to the ground because of a ground level ejection, may be too near the ground because of the low level of the aircraft or, may have been moving downwardly with the aircraft so that the seat, after it has been ejected, continues to move downwardly because of the speed transmitted to it by the aircraft before ejection. In any of such various situations, the seat must be moved upwardly several hundred feet away from the aircraft and this is accomplished by the ignition of the gas generators 88 and 90 after ejection.

The ignition of the individual gas generators 88 and 90 and the operation of the roll thruster pintle valves 60 and 62 provide the required pressure in order to raise the seat the required amount above the aircraft and make the ultimate position safe for the occupant.

The roll thrust housing 96, FIG. 9, is open to the manifold 92 and valves 60 and 62 are opened, as shown. The nozzles 50 and 52 open to the manifold by means of openings 98, through supports 100 in which the valves are slidably engaged. The valves are connected to servo control modules 102 and 104, operated by microprocessor, not shown. Connected to each of the servo control modules are servovalve actuators 106 and 108, shown schematically. The actuators may be in the form of a solenoid or a hydraulic piston for example. The solenoid or piston can be directly connected to the valve so as the solenoid would move in the direction of closing the valve, it would push the valve and as it would be retracted, it would withdraw the valve so that it would open. The amount of movement of the valve would be dependent upon the signal provided by the microprocessor to the servo control modules.

As the propellant charges are ignited simultaneously or sequentially, depending upon the need to move the ejected seat away from the aircraft, a substantial part of the generated gas is delivered to the primary thruster 110 to move the seat away from the aircraft.

The ignition of the gas generators 88 and 90 occurs in ten milliseconds or less and is accomplished beyond the seat occupants' control. As may be seen from FIG. 9, if it is desired that the seat be rolled to the right, the gas would be caused to move out of the roll thruster 50 by the opening of the valve 60 and the valve 62 would be closed. Under certain conditions, one of the valves would be open more than the other so as to provide a differential thrust level from side to side. In addition the valves may both be open to allow excessive gas pressure to be discharged. As may be seen the only valving system for the catapult pressure control are the controlling roll attitude thrusters and the primary rocket thrust for the seat would come from the large nozzle 110, located near the bottom of the manifold/outer catapult tube 46.

In the second embodiment, shown in FIGS. 10–12, a seat generally, designated as 120, and being similar in general to the seat 10 has an outer catapult tube 122 and an inner catapult tube 124, the latter being secured to the aircraft at 126 and the outer tube being ejected with the seat as in the first embodiment. A sealing plug 66A functions in the same manner as the plug 66 in the first embodiment and plugs the outer catapult at its bottom by means of a holding sleeve, not shown, as 84 in FIG. 9.

In this embodiment the separate rocket motors 130, 132 are positioned in layers under the seating portion of the seat and are connected to a manifold 136 which in turn is connected to the outer catapult by passage 138, FIGS. 10 and 11. Thus, after ejection the separately ignitable gas generators under the seat are open to the outer catapult tube 122 similarly to the arrangement shown in FIG. 8 but not as directly.

At the rear of the seat there are two additional gas generators 142 and 144, connected directly to the outer catapult at 146 and 148, FIG. 12.

The seat is supported in the aircraft by three sets of rollers 150, 152 and 156 which ride in channel-shaped rails during ejection.

The operation of the ignition of the gas generators after ejection is very rapid and out of the control of the seat occupant as in the first embodiment. In this embodiment additional controls are shown. For example, there are two primary thrusters 160 and 162 at the lower rear portion of the seat and on opposite sides thereof. The primary thruster nozzles 160 and 162 are directed by actuators 164 and 166, respectively, which in turn are operated by microprocessors.

At the top of the seat are roll and yaw thruster nozzles 170 and 172 which provide for a maximum roll and yaw control and are especially effective in their position because of the low center of gravity provided in the positioning of the gas generators under this seat.

On opposite sides at the rear of the seat are yaw thruster nozzles 176 and 178 which are either operated to be fully open, partially opened or balanced, and may be operated by servovalves, not shown. Their operating valves are connected to the manifold 136.

There are two pitch thruster nozzles 182 and 184. The nozzle 182 is forwardly and centrally under the seat and nozzle 184 is substantially midway up the back of the seat and centrally positioned. Nozzle 182 is directly connected at 186 and 188 to gas generators 132 and the pitch nozzle 184 is directly connected to the outer catapult at 190. Pitch rocket thrusters are also operated by servovalves which may conveniently be gas operated. One of the pitch thruster nozzles must be open at all times when the seat is being elevated above the aircraft.

The primary nozzles 160 and 162 thrust downwardly to overcome the downward thrust the seat may have due to the movement of the aircraft before ejection and in general serve to raise the seat away from the aircraft. The total seat elevation time after ejection is of the order of 1.5 seconds.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. We so not wish to be restricted to the specific form shown or uses mentioned except as defined in the accompanying claims.

What is claimed is:

1. An aircraft ejection seat having catapult means for ejecting the seat and carrying it away from the aircraft, comprising:
    an outer catapult tube secured to the seat for ejection therewith from the aircraft, said outer catapult tube including an upper and a lower end, and said outer catapult tube being closed at its upper end;
    an inner catapult tube within the outer catapult tube, said inner catapult tube having a lower end secured to the aircraft and an upper end;
    plug means within the outer catapult tube which prior to ejection is supported on and by the upper end of the inner catapult tube;
    propellant means between the plug means and the closed upper end of the outer catapult tube, which when ignited creates propellant gases for moving the outer catapult tube upwardly away from the plug means and the inner catapult tube; and
    holding means within the outer catapult tube adjacent the lower end of the outer catapult tube positioned to engage the plug means and secure the plug means in position adjacent the lower end of the outer catapult tube when the outer catapult moves upwardly during ejection, so that the plug means will stay with and becomes a lower closure wall for the outer catapult tube when the outer catapult tube moves off from the inner catapult tube and away from the aircraft.

2. The invention according to claim 1, wherein the outer catapult tube includes a rocket nozzle extending therefrom at a location which is below the plug means prior to ejection and above the plug means following ejection; and
    gas generator means positioned to discharge into the outer catapult tube, following ejection, so that the outer catapult tube will function as a manifold between the gas generator means and the rocket nozzle.

3. The invention according to claim 2, wherein the gas generator means comprises a plurality of separately ignitable gas generators, each connected to discharge gases into the outer catapult tube.

4. The invention according to claim 3, wherein the gas generators are incorporated into the ejection seat.

5. The invention according to claim 2, comprising at least one attitude control thrust nozzle in gas receiving communication with the outer catapult tube following ejection; and
    valve means between the outer catapult tube and the attitude control thrust nozzle.

6. The invention according to claim 5, a pair of attitude control thruster nozzles at an upper portion of the seat, each positioned to discharge laterally of the seat in a direction opposite the other, and wherein said valve means is operable to communicate the outer catapult tube with either one or both of said thrusters.

7. The invention according to claim 1, wherein the plug means comprises an outer side surface which slidably engages an inner side surface of the outer catapult tube, said plug means having a lower end including a downwardly opening circumferential groove positioned to receive an upper end portion of the inner catapult tube;
    said plug means including a cylindrical wall forming an outer side boundary of the groove;
    said holding means comprising a bearing which makes sliding engagement with the inner catapult tube during ejection; and
    said bearing including an upwardly directed inner surface positioned to contact and engage the cylindrical wall of the plug means during ejection, said contact between the inner surface of the bearing and the cylindrical wall of the plug means providing a seal between the lower end of the outer catapult tube and the plug means.

8. The invention according to claim 7, wherein said upwardly direct surface is an upwardly widening conical surface.

9. The invention accordng to claim 7, wherein said cylindrical wall of the plug means is deformable so that it will deform and substantially conform to the shape of the inner surface of the bearing when contacted by such surface as the outer catapult tube moves off from the inner catapult tube.

10. The invention according to claim 1, wherein the ejection seat has a back portion, and wherein the outer catapult tube is incorporated into the back portion of the seat and functions to stiffen the back portion of the seat.

11. The invention according to claim 10, comprising a plurality of gas generators incorporated into the back portion of the ejection seat on opposite sides of the outer catapult tube, each said gas generator being connected to discharge into the outer catapult tube.

12. The invention according to claim 11, wherein the outer tube is positioned generally centrally within the back portion of the ejection seat and the gas generators extend generally transversely outwardly from the outer catapult tube and are juxtaposed on each side of the outer catapult tube, one above the other.

13. The invention according to claim 1, further comprising two oppositely directed thruster nozzles adjacent the top of the ejection seat;
    passageway means extending between the outer catapult tube and said thruster nozzles;
    gas generator means connected to discharge gases into the outer catapult tube following ejection;
    valve means for said thruster nozzles operable to open both nozzles equal amounts to modulate internal pressure without creating roll thrust, or unequal amounts to create roll thrust.

14. The invention according to claim 1, wherein the ejection seat includes a sitting portion and the outer catapult tube includes a rocket nozzle extending therefrom at a location which is below the plug means prior to ejection and above the plug means following ejection; and gas generator means secured under the sitting portion of the seat, said gas generator means being connected to discharge into the outer catapult tube following ejection.

15. The invention according to claim 14, wherein the gas generator means comprises a plurality of gas generators connected with the outer catapult tube and being individually ignitable.

16. The invention according to claim 15, comprising a manifold between the gas generators and the outer catapult tube, said gas generators being connected to discharge into the manifold and the manifold being connected to discharge into the outer catapult tube at a location which is above the position of the plug means following ejection.

17. The invention according to claim 1, wherein the outer catapult tube includes a rocket nozzle extending therefrom at a location which is below the plug means prior to ejection and above the plug means following ejection, and a plurality of gas generators extending parallel to the outer catapult tube, on opposite sides of the outer catapult tube, said gas generators being connected to discharge into the outer catapult tube at a location that is above the position of the plug means following ejection.

* * * * *

UNITED STATES PATENT AND TRADEMARK OFFICE
CERTIFICATE OF CORRECTION

PATENT NO. : 4,749,154
DATED : June 7, 1988
INVENTOR(S) : Gerald F. Herndon

It is certified that error appears in the above-identified patent and that said Letters Patent are hereby corrected as shown below:

```
Column 1, line 32,  "thust" should be  -- thrust --.
Column 1, line 46,  "supplmentary" should be
    -- supplementary --.
Column 2, line 20,  "proellant" should be
    -- propellant --.
Column 4, line 48,  "siffens" should be  -- stiffens --.
Column 4, line 62, after "formed", insert -- by --.
Column 5, line 1, after "end", insert -- of --.
Column 6, line 8,  "occupants'" should be
    -- occupant's --.
Column 6, line 32,  "postioned" should be
    -- positioned --.
Column 7, line 19,  "so" should be  -- do --.
Claim 6, column 8, line 5, after "claim 5," insert
    -- including --.
Claim 8, column 8, line 31,  "direct" should be
    -- directed --.
Claim 9, column 8, line 33,  "accordng" should be
    -- according --.
```

Signed and Sealed this

Twenty-eighth Day of February, 1989

Attest:

DONALD J. QUIGG

Attesting Officer     Commissioner of Patents and Trademarks